United States Patent [19]

Wichterle

[11] Patent Number: 4,874,234
[45] Date of Patent: Oct. 17, 1989

[54] TORIC CONTACT LENS WITH DISPLACED CENTER OF GRAVITY

[75] Inventor: Otto Wichterle, Prague, Czechoslovakia

[73] Assignee: Ceskoslovenska akademie ved, Czechoslovakia

[21] Appl. No.: 743,519

[22] Filed: Jun. 11, 1985

[30] Foreign Application Priority Data

Jun. 18, 1984 [CS] Czechoslovakia .................... 4634-84

[51] Int. Cl.$^4$ ................................................ G02C 7/04
[52] U.S. Cl. ................................ 351/161; 351/160 H
[58] Field of Search .............. 351/160 R, 160 H, 161, 351/162, 177

[56] References Cited

U.S. PATENT DOCUMENTS 4,508,436 4/1985 Sitterle ............................ 351/160 H

FOREIGN PATENT DOCUMENTS 62178 10/1982 European Pat. Off. ........ 351/160 H
2281584 3/1976 France ............................ 351/160 H Primary Examiner—Scott J. Sugarman
Attorney, Agent, or Firm—Leydig, Voit & Mayer

[57] ABSTRACT

A toric contact lens with the center of gravity displaced in the direction to its edge by the effect of an one-sided thickening of the lens, where, according to the invention, its optical zone has as far as to the diameter of 5 to 8 mm the center of gravity precisely in the lens axis and the thickening is performed at one place of its edge to displace the center of gravity of the whole lens outside its axis, which thickening has the form of a drop, which would be formed by running down a liquid wetting a front convex surface of the lens if the lens is placed in the vertical position, whereas the direction of displacement of the center of gravity includes the required angle with the direction of toricity of the optical zone.

The casting surface of mould for production of the toric contct lens according to the invention is provided with a marginal cavity corresponding to the required thickening.

Moulds charged with a metered amount of monomer mixture are used for casting of the lens according to the invention in common equipment either for spin casting or for static casting in closed moulds.

5 Claims, 1 Drawing Sheet

TORIC CONTACT LENS WITH DISPLACED CENTER OF GRAVITY

BACKGROUND OF THE INVENTION

1. Field of the Invention

The invention pertains to a toric contact lens with the center of gravity displaced to its edge by making the lens thicker at one side, to a mould for producing the said lens and to a method of manufacturing the moulds.

2. Description of the Prior Art

Cutting or grinding off a lens section on the lower side of lens ("truncation") has been the method used almost exclusively to stabilize toric lenses against rotation in the eye and in a constant position of its cylindric (toric) axis according to the axis of astigmatism of the eye. The center of lens gravity is shifted upwards in this case and the lens would tend to turn by 180° due to gravity unless the centre of lens gravity was shifted in the direction of the cut edge at the same time. This is realized, at present, almost exclusively by a prismatic shape superimposed to the whole lens, including its optical part, in such a way, that the lens is continuously thickened in all its parts towards the cut lower part (so called "prism ballast"). This leads to an excess of mass in the lower part and to a perfect stabilization of the lens in the eye, but a large thickness of the created edge causes, even if it is perfectly rounded, an unpleasant mechanical irritation of the lower eyelid which runs against this thick edge during blinking. In addition to this, the very optics of the lens is deformed by the addition of prismatic component to its refraction, thus shifting the perceived image in the vertical direction.

Another design of toric lens was proposed in the Czechoslovak Pat. No. 198,748 to obtain stabilization without above mentioned shortcomings. A soft lens was provided with thicker projections, which should shift the center of gravity to one side. However, this adaptation was successful only in part, because the proposed projections did not develop a sufficiently strong effect, which would provide a reliable stabilization of lens, and the projections of a larger size irritated the eyelid and caused undesirable motions by impact of the eyelid on the projections of recommended shape.

SUMMARY OF THE INVENTION

The above mentioned shortcomings have been avoided according to the invention by designing a toric contact lens, wherein the optical zone of the said lens has the center of gravity up to the diameter of 5 to 8 mm precisely in the lens axis and the center of gravity of the whole lens is displaced from its axis by creating a thickening, at one place of the lens edge, having a shape of a drop which would arise by running-down of a liquid wetting the front convex surface of the lens place in the vertical position, while the direction of displacement of the center of gravity includes the required angle with the direction of toricity.

The arrangement of marginal thickened zone in the form of a hanging drop represents, in fact, an ideal and continual distribution of the added material of lens with the maximum mass on the edge but with a minimum of irritation, in particular, if the said thickening is reduced, at some places, by as much as 0.2 mm, so that the thickening is completely cancelled close to the circumferential edge and the circumferential edge of lens has the same shape along the whole circumference.

These advantages are especially evident if the lenses are made from a soft gel swelled with water, for example, a poly(glycol methacrylate) gel.

Another objective of the invention is an adaptation of the said lens, which consists in providing at least one corpuscle from metal inside the thickened part of lens. These metallic corpuscles have advantageously the spherical shape and are preferably made from noble metals of platinum group, gold or silver, or alloys of these metals.

A method for production of soft lenses shaped in this way or also supplemented with a metallic part is extraordinarily simple and highly efficient in spite of the apparent complexity of the shape. The production of these lenses by highly progressive methods of monomer casting is concerned in particular.

The lens according to this invention with an inner surface of a precisely symmetrical well-tried shape may be produced by spom casting which is carried out in open moulds having the casting surface provided with a marginal cavity corresponding to the required thickening.

The production of toric contact lenses according to the invention, which are provided with a corpuscle from metal, is advantageously carried out by addition at least one corpuscle from metal (e.g., a metallic ball) to the metered monomer mixture in casting moulds, which corpuscle spontaneously fits into the marginal cavity during the prescribed rotation of mould and takes up a position in the deepest place of cavity, while it is completely overcast with the meniscus of rotating monomer mixture.

Further objective of the invention is a two-part mould for a static casting of toric contact lenses according to the invention in a space demarcated by a concave part and a convex part, where a cavity corresponding to the required thickening is created in the convex part. The angle between the axis of toricity of the cast lens and the direction of displacement of its centre of gravity may be continuously varied by mutual angular displacement of both parts.

The moulds according to the invention are advantageously made in such a way, that a part of a forming tool, which serves to formation of the concave casting surface, is provided with a drop from a low-melting metal, advantageously from tin, which is allowed to run down to the edge, and a surface layer is removed from the solidified drop as far as the whole optical zone and the circumferential edge are uncovered, and the part of forming tool adapted in this way is then slided into a tool sleeve.

BRIEF DESCRIPTION OF THE DRAWINGS

The presented diagrammatic drawings (FIG. 1 to FIG. 5) serve for illustration of the invention.

DESCRIPTION OF PREFERRED EMBODIMENTS

Figure 1:
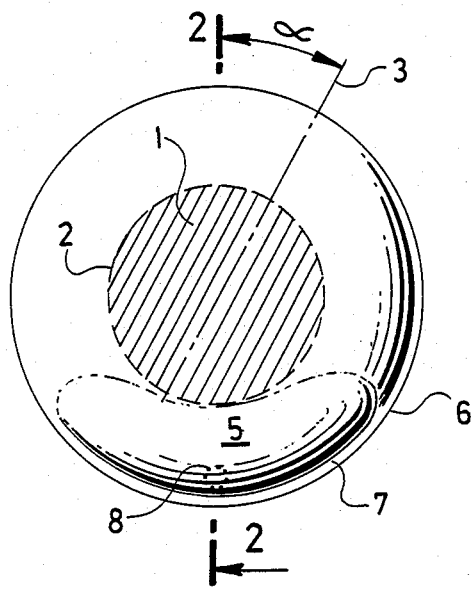
FIG. 1 is a front view of the lens.

FIG. 1 shows a front view on a lens, an optical zone of which demarcated by the dashed circle 2, has a toric shape, in contrast to the rotation-symmetrical back side of the lens, i.e. such a shape that the refractive power of the convex surface of optical zone has, in addition to the spherical component of refraction, also a cylindric refraction component, which axis 3 is marked by a straight line. The plane 2—2, normal to the plane of projection passes through the center of lens gravity and thus marks a vertical direction into which the lens is spontaneously oriented by the gravity action. The angle $\alpha$ between the said plane and the axis 3 is one of lens parameters, which serve to the selection of such lens from the stock, which has the angle $\alpha$ closest to the slope of astigmatism axis of patient's eye.

Figure 2:
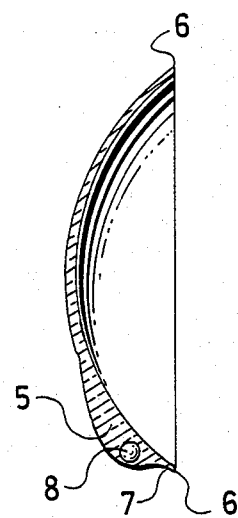
FIG. 2 is a diagrammatic cross section of the lens of FIG. 1 along the line 2—2.

The lower thickening of lens 5 and its thickness profile are shown in FIG. 2 as a sectional view in the plane 2—2. The thickening of lens 5 has the shape of a hanging drop and does not reach as far as to the edge 6 of lens, but continuously proceeds first after a small gap 7 from the edge 6, so that the shape of the whole lens circumference near to the edge is perfectly the same. A ball 8 from an alloy of gold and platinum (so called white gold) may be enclosed by polymerization inside the thickened part, where it rests on the outer side by its dull surface and is coated with a somewhat thicker layer of lens material in the direction towards the inner surface of lens. The metallic corpuscle could have also another shape than spherical, for example, the form of rounded strip or of an ovoid. However, it is more convenient, with respect to the bending strength of lens, to enclose numerous tiny metallic balls into the thickening 5 by polymerization instead of a single corpuscle.

Figure 3:
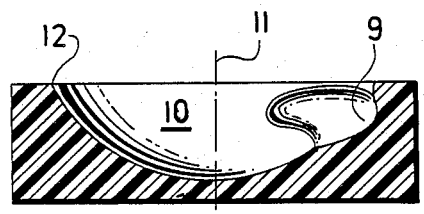
FIG. 3 is a diagrammatic cross section of a polypropylene mould for centrifugal casting of the lens of FIGS. 1 and 2.

The FIG. 3 shows a polypropylene mould, for centrifugal casting of a lens demonstrated in FIGS. 1 and 2, in an axial sectional view. The section passes through the middle of cavity 9, which has a shape negative to the thickening 5 (FIG. 2) of cast lens. The central part 10 of casting surface, as far as to the diameter of 6 mm, has a toric shape with the axis of cylindric component turned to the chosen angle with respect to the projection plane. This axis 11, which is the axis of the circumferential edge 12, is, at the same time, the axis of mould rotation in a polymerization apparatus and coincides with the optical axis of cast lens as it is marked by a dashed straight line in FIG. 2.

Figure 4:
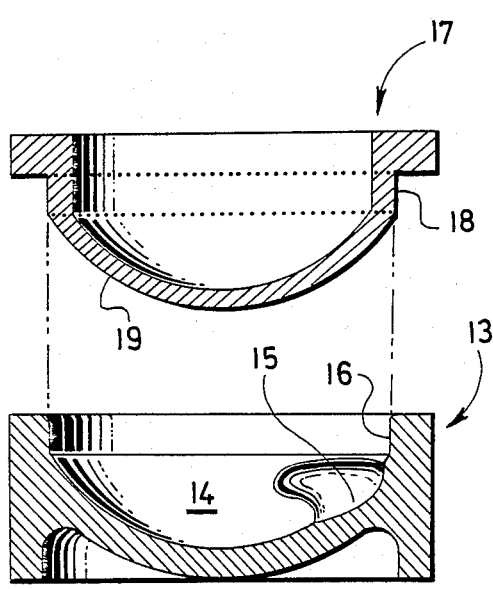
FIG. 4 is a diagrammatic cross section of a two part polypropylene mould for static casting of the lens of FIGS. 1 and 2.

FIG. 4 shows a two-part polypropylene mould for a static casting of lenses, similar to the lens in FIGS. 1 and 2, in an transversal axial sectional view. The lower part 13 has a rotation symmetrical central part of the casting surface 14, which is, consequently, not toric. It has the cavity 15, which corresponds by the shape to the lens thickening 5 (FIG. 2), created closely behind the edge. Instead of a sharp boundary edge, the concave cavity of part 13 turns into a cylindric or moderately conical toroidal surface 16, which serves to a precise guiding of the upper part 17 by insertion of its similarly cylindric or moderately conical surface 18. The central part of convex casting surface 19 has a toric shape. Depending on the mutual turning of part 13 and 17, which enclose a monomer mixture, the angle between the stabilization axis of the lens and the direction of its cylindric refractive component may be arbitrarily and continuously set. The difference between the lenses cast in this way and the lenses cast by the spin-cast method consists in the toricity formed on their inner instead of outer side. In consideration of their softness and thinness, this difference is without importance for the lens function and is very difficult to ascertain.

Figure 5:
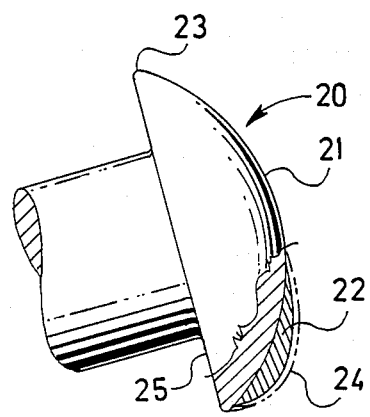
FIG. 5 is a side view and a diagrammatic sectional view of a forming tool used in the production of the cast moulds of FIGS. 3 and 4.

FIG. 5 shows the maufacturing of a forming tool serving in the production of cast moulds for the lenses according to the invention produced by spin casting. Only a part 20 of the forming tool, which is most important for its function, is demonstrated in an axial sectional view corresponding to the section of lens in FIG. 2. This part creates the proper casting surface of mould and is made from hardened steel. A convex surface 21 of this part, for that time still without projection 22, is grond to optical quality in its optical center and also its outer part with a circumferential ring is definitively adapted to the well-tried shape for production of common lenses by spin casting. Then, the part 20 is heated above 300° C. in a sloped or as much as horizontal position and a weighed grain of pure tin is melted to the lower surface at this temperature. A perfect wetting of the lower half of surface 21 with tin is attained with rosin or some other soldering agent and first then the melted tin is allowed run down freely and solidify by cooling in the form of a regular drop. As a rule, tin surpasses below as far as to the circumferential edge 23 and by climbing up to the optical zone as a thin film, as it is marked by the dashed line 24. By the following polishing, as much tin is removed as far as possible evenly to uncover completely the edge 23 and to remove all tin from the optical zone. The tin projection 22 obtains thus the final shape marked in the sectional view as a thick hatched area. All transitions from the tin surface to the steel surface are then perfectly smooth and the whole convex surface of part 20 is finished to a high gloss. The part 20 is then inserted into an outer part of the forming tool so that its surface 25 precisely fits into the plane of this outer part.

The described method for preparation of forming tools for injection moulding of moulds is by far most advantageous. One can easily realize that the most expensive part, i.e. the steel body with the ground central toric surface, can be modified within broad limits and also precisely reproduced by the size and position of the tin lug, without damage of the steel part.

Even when the combination steel-tin is recommended in the above examples, tin may be replaced, for example, with hard lead (Pb+3%As), or various alloys of tin, lead, antimony, bismuth, zinc, copper, cadmium, silver, and the like. Instead of steel, it may be used, for example, nickel or alloys nickel-chromium, nickel-silver, and the like.

Manufacturing of forming tools by other than the described method may be also realized, for example, by machining of a single piece of material with precise copying lathes according to magnified precisely shaped models. However, such methods are much more expensive and do not warrant even the same accuracy, in particular in the region of optical zone.

The moulds charged with a metered amount of monomer mixture are used in the proper casting of lenses in common equipments, either for spin casting or for static casting in closed moulds. If metallic balls are inserted into the mixture, they spontaneously resume, as a rule, their equilibrium position in the cavity of mould during spin casting. However, this may be assisted by several rapid interruptions of the mould rotation before the moulds are inserted into a polymerization apparatus. The heavy balls run along the circumference by inertia and eventually rest in the cavity. The moulds for static casting should be held in this case during assembly in such a way, that the balls fit into the cavity.

I claim:

1. A toric contact lens with a center of gravity displaced in the direction towards its edge due to one-sided thickening, wherein an optical zone of the said lens has a center of gravity precisely in the lens axis, the thickening being along one edge of the lens to displace the center of gravity of the whole lens outside its axis, said thickening having the shape of a drop which would be formed by the running down due to gravity of a liquid wetting the front convex suface of the lens after placing the lens in a vertical position.

2. The toric contact lens according to claim 1, wherein the height of its thickening is continuously reduced in such a way that the thickening is completely cancelled close to the circumferential edge and the circumferential edge of lens has the same shape along the whole circumference.

3. The toric contact lens according to claim 2 wherein said lens is made from a soft water-swelled gel.

4. The toric contact lens according to claim 3, wherein at least one metallic corpuscle is adapted inside its thickening.

5. The toric contact lens according to claim 4, wherein the metallic corpuscle has an approximately spherical shape and consists of heavy noble metals of platinum group, gold or silver, or of alloys of these metals.

* * * * *